US012728297B2

(12) United States Patent
Carloni et al.

(10) Patent No.: US 12,728,297 B2
(45) Date of Patent: Sep. 8, 2026

(54) PROTECTIVE GARMENT

(71) Applicant: Honeywell Safety Products USA, Inc., Charlotte, NC (US)

(72) Inventors: Anna Katherine Carloni, Dayton, OH (US); Jonathan Allen, Piqua, OH (US); Josée Lalonde, St Louis de Gonzague (CA); Lisa Ann Cubas Ray, Centerville, OH (US)

(73) Assignee: Honeywell Safety Products USA, Inc., Latham, NY (US)

( * ) Notice: Subject to any disclaimer, the term of this patent is extended or adjusted under 35 U.S.C. 154(b) by 0 days.

(21) Appl. No.: 19/066,730

(22) Filed: Feb. 28, 2025

(65) Prior Publication Data

US 2026/0257084 A1 Sep. 3, 2026

(51) Int. Cl.
*A41D 27/28* (2006.01)
*A62B 17/00* (2006.01)
*A41D 3/02* (2006.01)

(52) U.S. Cl.
CPC .................................. *A62B 17/003* (2013.01)

(58) Field of Classification Search
CPC .................................................... A62B 17/003
See application file for complete search history.

(56) References Cited

U.S. PATENT DOCUMENTS 1,015,231 A * 1/1912 Jacobs ..................... A41D 1/02 2/DIG. 1
3,045,243 A * 7/1962 Lash ...................... A41D 27/28 2/87
3,086,215 A 4/1963 John
4,608,715 A * 9/1986 Miller .................. A41D 27/285 2/87
4,665,563 A * 5/1987 Harvey .................... A41D 3/04 2/87
4,731,883 A * 3/1988 Foster .................... A41D 27/28 2/DIG. 1
5,188,267 A * 2/1993 Sargent .................... A62B 9/04 128/202.19
5,507,042 A * 4/1996 van der Slessen .... A41D 27/28 2/108
5,642,526 A * 7/1997 Thompson ............. A41D 13/02 2/DIG. 1
5,685,015 A 11/1997 Aldridge
(Continued)

FOREIGN PATENT DOCUMENTS

WO 2013019931 A1 2/2013

OTHER PUBLICATIONS

International Searching Authority, "International Search Report and Written Opinion" , From Application No. PCT/US2026/017093, Mailed Jun. 17, 2026, pp. 15.

*Primary Examiner* — Robert H Muromoto, Jr.
(74) *Attorney, Agent, or Firm* — Fredrikson & Byron, P.A.

(57) ABSTRACT

A protective garment includes an inner layer and an outer layer detachably attached over the inner layer. The outer layer includes at least one flexible panel integrated at a first portion and a second portion of the outer layer of the protective garment, the at least one flexible panel is configured to provide flexibility to the protective garment and an overlay panel sewn to the first portion of the outer layer at a first side and a second side of the overlay panel to cover at least a portion of the at least one flexible panel integrated at the first portion.

18 Claims, 5 Drawing Sheets

(56) References Cited

U.S. PATENT DOCUMENTS

| | | | | | |
|---|---|---|---|---|---|
| 5,704,064 | A * | 1/1998 | van der Sleesen | A41D 27/28 | 2/108 |
| 5,752,277 | A * | 5/1998 | van der Sleesen | A41D 27/28 | 2/108 |
| 5,845,336 | A * | 12/1998 | Golde | A41D 27/28 | 2/93 |
| 6,332,221 | B1 * | 12/2001 | Gracey | A41B 9/00 | 2/108 |
| 6,795,976 | B1 * | 9/2004 | van der Sleesen | A41D 27/28 | 2/DIG. 1 |
| 6,868,557 | B1 * | 3/2005 | van der Sleesen | A41D 27/28 | 2/93 |
| 6,883,178 | B2 * | 4/2005 | van der Sleesen | A41D 27/28 | 2/108 |
| 7,578,005 | B2 * | 8/2009 | Vereen | A41B 1/00 | 2/92 |
| 8,011,020 | B2 * | 9/2011 | Vereen | A41B 1/08 | 2/92 |
| 8,756,714 | B2 * | 6/2014 | Reimer | A41D 27/28 | 2/81 |
| 9,301,556 | B2 * | 4/2016 | Koller | A41D 3/02 | |
| 9,392,825 | B2 * | 7/2016 | Pezzimenti | B29C 65/02 | |
| 9,974,347 | B2 * | 5/2018 | Audet | A41D 27/28 | |
| 10,349,687 | B2 * | 7/2019 | Baschak | A41D 31/102 | |
| 10,433,594 | B2 * | 10/2019 | Espili | A41D 13/02 | |
| 10,874,154 | B2 * | 12/2020 | Aitch | A41D 27/285 | |
| 11,889,877 | B2 * | 2/2024 | Simmons | A41D 31/14 | |
| 11,986,034 | B2 * | 5/2024 | Rafn | A41D 27/28 | |
| 11,998,072 | B2 * | 6/2024 | Patton | A41D 31/065 | |
| 2003/0033656 | A1 * | 2/2003 | Jaeger | A41D 27/28 | 2/93 |
| 2003/0104734 | A1 * | 6/2003 | Polegato Moretti | A41D 27/28 | 428/343 |
| 2006/0059601 | A1 * | 3/2006 | Opitz | A41D 27/00 | 2/108 |
| 2007/0245443 | A1 * | 10/2007 | Vereen | A41D 27/28 | 2/69 |
| 2009/0077710 | A1 * | 3/2009 | Bay | A41D 3/00 | 2/243.1 |
| 2010/0043116 | A1 * | 2/2010 | Vereen | A41B 1/08 | 2/81 |
| 2011/0239350 | A1 * | 10/2011 | Ho | A41D 31/145 | 2/93 |
| 2012/0210499 | A1 * | 8/2012 | Habash | A41D 27/28 | 2/456 |
| 2016/0242474 | A1 * | 8/2016 | Baschak | A41D 13/0015 | |
| 2017/0360129 | A1 * | 12/2017 | Moore | A41B 1/10 | |
| 2018/0049494 | A1 * | 2/2018 | Darmour | A41D 3/005 | |
| 2020/0282243 | A1 * | 9/2020 | Martinez | A41D 27/285 | |
| 2021/0137192 | A1 * | 5/2021 | Rafn | A41D 31/145 | |

* cited by examiner

PROTECTIVE GARMENT

TECHNOLOGICAL FIELD

Example embodiments of the present disclosure generally relate to a garment, and more particularly relate to a protective garment for firefighters or related front-line emergency responders.

BACKGROUND

Firefighters and emergency responders frequently operate in high-risk environments that expose them to extreme heat, flames, hazardous chemicals, and toxic particulate matter. To protect firefighters and related front-line emergency responders, protective garments such as fire-resistant coats and suits are designed to offer essential heat resistance, durability, and barrier protection. Conventional heavy-duty protective clothing severely limits the wearer's mobility, causing physical strain and reduced efficiency during critical tasks. Furthermore, insufficient breathability in many protective garments leads to excessive heat retention, discomfort, and potential heat stress for the firefighters, especially during long shifts in extreme conditions. Such challenges are exacerbated in areas of the garment that require frequent movement, such as the underarms, back, and elbows, where rigid materials restrict the range of motion of arms and legs.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a protective garment is disclosed. The protective garment comprises an inner layer and an outer layer detachably attached over the inner layer. Further, the outer layer comprises at least one flexible panel integrated at a first portion and a second portion of the outer layer of the protective garment, the at least one flexible panel is configured to provide flexibility to the protective garment. Further, the outer layer comprises an overlay panel sewn to the first portion of the outer layer at a first side and a second side of the overlay panel to cover at least a portion of the at least one flexible panel integrated at the first portion. In some embodiments, the first portion corresponds to a rear portion of the outer layer and the second portion corresponds to a sleeve portion of the outer layer.

In some embodiments, the overlay panel further comprises a third side and a fourth side, the first side corresponds to a top side, the second side corresponds to a bottom side, the third side corresponds to a left side, and the fourth side corresponds to a right side of the overlay panel. In some embodiments, the first side of the overlay panel is sewn to a shoulder region of the outer layer and the second side is sewn to a middle back region of the outer layer. Further, the third side and the fourth side of the overlay panel are separated from the outer layer via a gusset. In some embodiments, the third side and the fourth side of the overlay panel separated from the outer layer via the gusset to allow ventilation of air through the gusset.

In some embodiments, the second portion further comprises a vent panel fabricated over the at least one flexible panel integrated at the second portion of the outer layer. In some embodiments, the vent panel is configured to provide ventilation to a user from the second portion of the outer layer.

In some embodiments, the outer layer further comprises a collar having a front shield and a chinstrap adapted to cover a neck and a chin of a user. In some embodiments, the outer layer is further integrated with a plurality of reflective strips to enhance visibility of the protective garment.

In some embodiments, the at least one flexible panel integrated at the first portion and the second portion of the outer layer is breathable and configured to block particulate matters from entering into the inner layer. In some embodiments, the at least one flexible panel is made of lightweight, air-permeable, and stretchable fabric and the outer layer is made of light weight, air-permeable, stretchable, and heat resistant fabric.

In another example embodiment, a method is disclosed. The method comprising steps of integrating at least one flexible panel at a first portion and a second portion of an outer layer detachably attached over an inner layer of a protective garment, the at least one flexible panel is configured to provide flexibility to the protective garment; and sewing an overlay panel to the first portion of the outer layer at a first side and a second side of the overlay panel to cover at least a portion of the at least one flexible panel integrated at the first portion.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
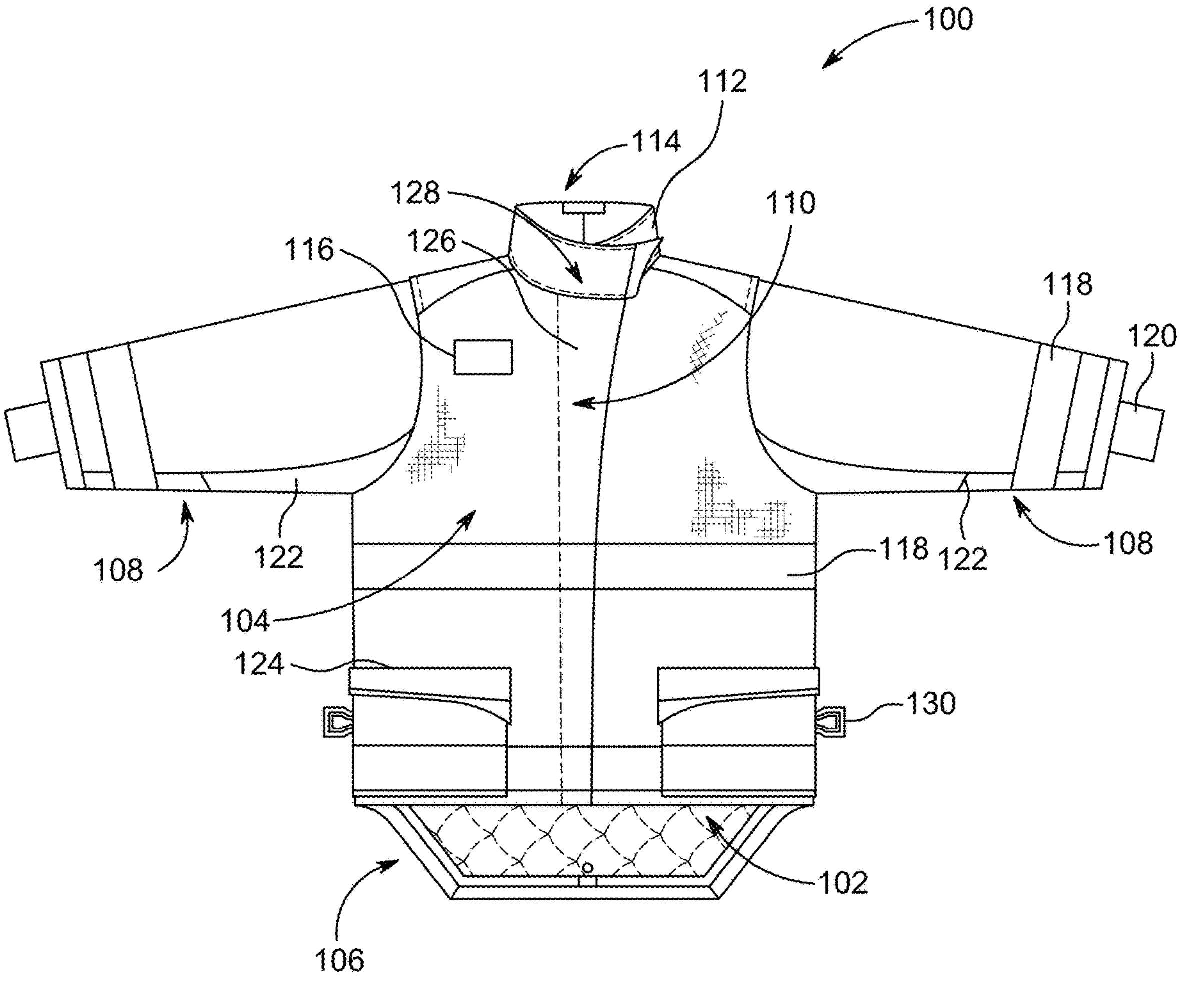
Figure 2:
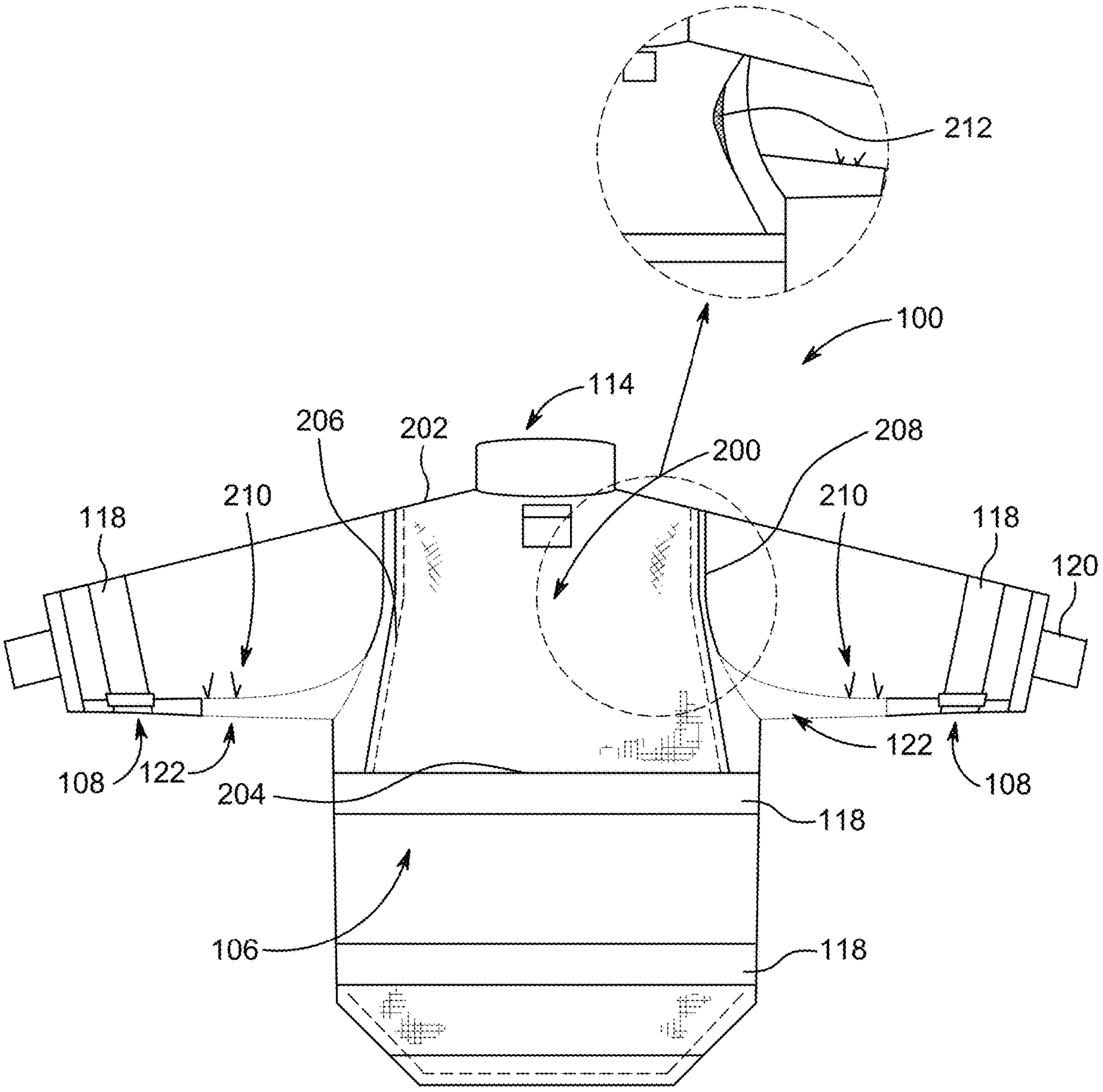
Figure 3:
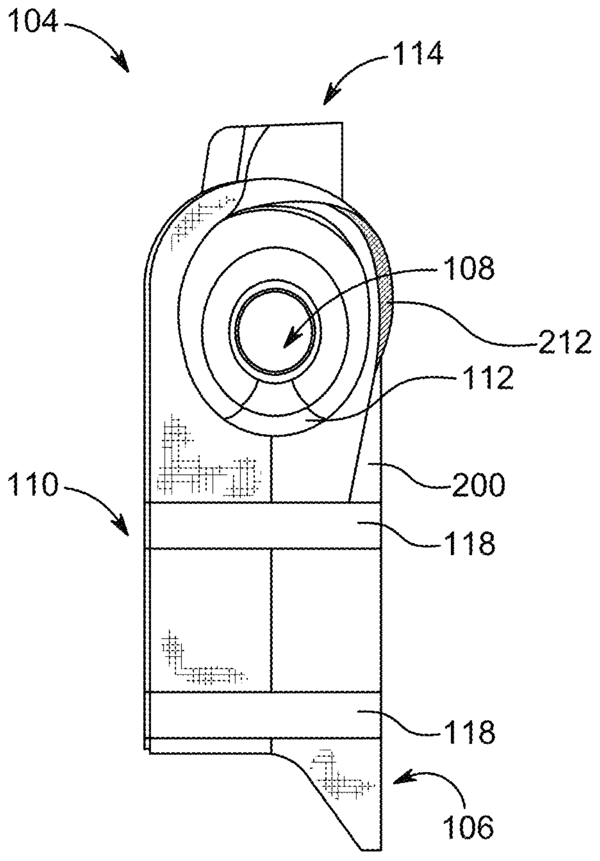
Figure 4:
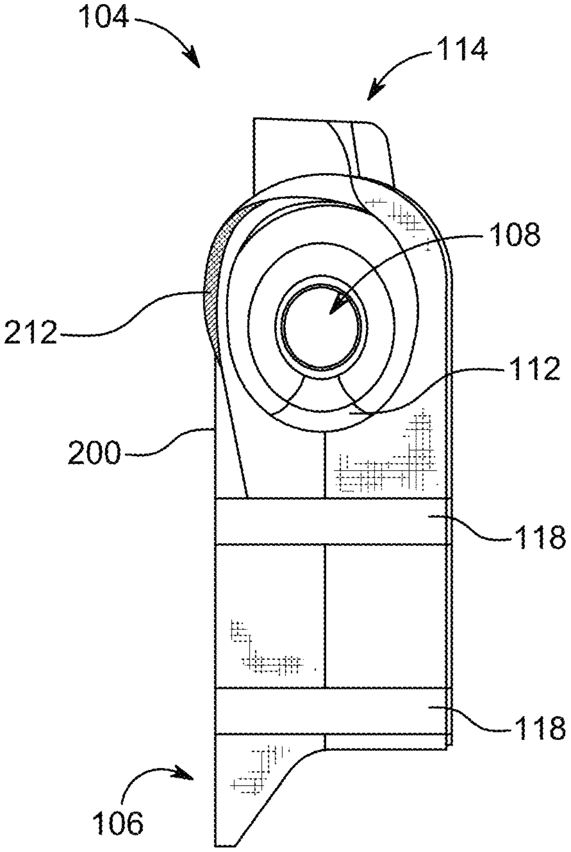
Figure 5:
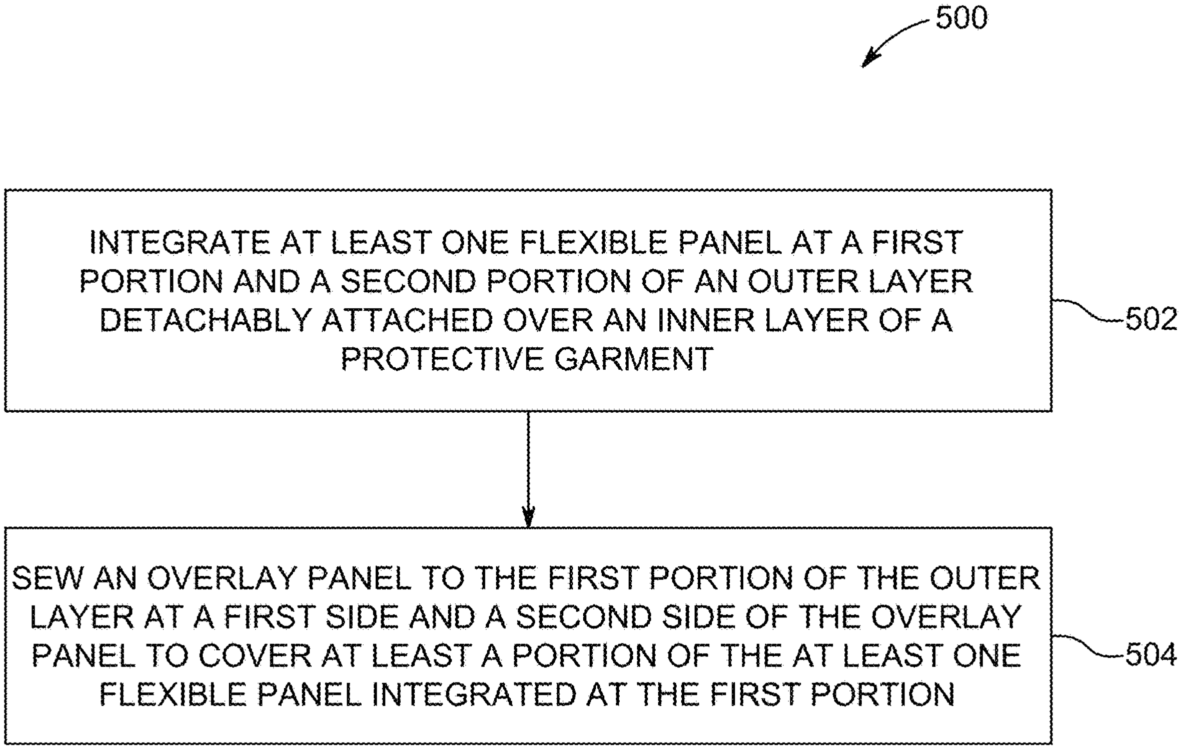

Having thus described certain example embodiments of the present disclosure in general terms, reference will hereinafter be made to the accompanying drawings, which are not necessarily drawn to scale, and wherein:

FIG. 1 illustrates a front view of a protective garment in accordance with an example embodiment of the present disclosure;

FIG. 2 illustrates a rear view of the protective garment in accordance with an example embodiment of the present disclosure;

FIG. 3 illustrates a side view of the protective garment in accordance with an example embodiment of the present disclosure;

FIG. 4 illustrates another side view of the protective garment in accordance with an example embodiment of the present disclosure; and FIG. 5 illustrates a flowchart showing a method in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of a protective garment. The protective garment may include an inner layer and an outer layer. Further, the outer layer may include at least one flexible panel and an overlay panel. Embodiments may be configured to provide protection during exposure to hazardous conditions. Embodiments may be configured to allow ventilation of air and provide flexibility and visibility of the protective garment.

FIG. 1 illustrates a front view of a protective garment 100, in accordance with an example embodiment of the present disclosure.

In some embodiments, the protective garment 100 may comprise an inner layer 102 and an outer layer 104. In some embodiments, the outer layer 104 may include a first portion 106 and a second portion 108. In some embodiments, the first portion 106 corresponds to a rear portion 106 of the outer layer 104 and the second portion 108 corresponds to a sleeve portion 108 of the outer layer 104. Hereinafter, the first portion 106 may be referred to as the rear portion 106 and the second portion 108 may be referred to as the sleeve portion 108. In some embodiments, the outer layer 104 may further include a front portion 110. In some embodiments, the outer layer 104 may be detachably attached over the inner layer 102. In some embodiments, the inner layer 102 may include a plurality of quilted and/or thermal protective layers. In an example, the plurality of quilted and/or thermal protective layers may be configured to protect the user from exposure to hazardous conditions (e.g., exposure to heat during a fire outbreak). In some embodiments, the outer layer 104 may be made of heat resistant and insulated fabric.

In some embodiments, the outer layer 104 may be configured to provide protection during hazardous conditions. The outer layer 104 may be configured to protect the user's body from exposure to heat, fire, or exothermic chemicals during the hazardous conditions. In some embodiments, at least one flexible panel 112 may be integrated at the rear portion 106 and the sleeve portion 108 of the outer layer 104.

In some embodiments, an overlay panel 200 (shown in FIG. 2) is sewn to the rear portion 106 of the outer layer 104. In some embodiments, the overlay panel 200 may be sewn at a first side 202 and a second side 204 of the overlay panel 200 to cover at least a portion of the at least one flexible panel 112 integrated at the rear portion 106. In some embodiments, the first side 202 corresponds to a top side of the overlay panel and the second side 204 corresponds to a bottom side of the overlay panel 200. In some embodiments, the overlay panel 200 further comprises a third side 206 and a fourth side 208. The third side 206 is the left side and the fourth side 208 is the right side of the overlay panel 200. In some embodiments, the first side 202 of the overlay panel 200 is sewn to a shoulder region of the outer layer 104 and the second side 204 is sewn to a middle back region of the outer layer 104. Further, the third side 206 and the fourth side 208 of the overlay panel 200 are separated from the outer layer 104 via a gusset 212. In some embodiments, the third side 206 and the fourth side 208 of the overlay panel 200 are separated from the outer layer 104 via the gusset 212 to allow ventilation of air through the gusset 212. In some embodiments, the gusset 212 is made of at least is made of at least, tri-laminate textile having at least two meta-aramid knits that helps in blocking hazardous particulates (e.g., carcinogens or debris) from reaching the user's body.

In some embodiments, the at least one flexible panel 112 may be fabricated in the sleeve portion 108 specifically covering mobility critical areas of the user's body. In some embodiments, the mobility critical areas may correspond to underarm and elbow of the user's body. In some embodiments, the sleeve portion 108 further comprises a vent panel 122 fabricated over the at least one flexible panel 112 integrated at the sleeve portion 108 of the outer layer 104. In some embodiments, the vent panel 122 is integrated with the gusset 212 that is configured to provide ventilation to a user from the sleeve portion 108 of the outer layer 104. In some embodiments, the at least one flexible panel 112 integrated at the sleeve portion 108 is configured to provide flexibility at the elbow and enable the user to bend or stretch their elbow without resistance. In some embodiments, the at least one flexible panel 112 is made of tri-laminate textile having at least two meta-aramid knits that helps in blocking hazardous particulates (e.g., carcinogens or debris) from reaching the user's body. In some embodiments, the at least one flexible panel 112 provides flexibility and breathability around the arms.

In an example, the at least one flexible panel 112 is configured to provide flexibility in the back and arms of the user wearing the protective garment 100. In some embodiments, the at least one flexible panel 112 may be configured to provide flexibility, so that the user wearing the protective garment 100 is able to move or bend their arms freely, without resistance. In some embodiments, the at least one flexible panel 112 integrated in the sleeve portion 108 (e.g. armhole and elbow) enhances free arm and elbow movement and enables overall dexterity of the user's hands. In an example, the at least one flexible panel 112 integrated in the rear portion 106 prevents resistance at the rear portion 106 of the outer layer 104 when the user stretches their arms. The at least one flexible panel 112 integrated at the rear portion 106 prevents resistance while the back and shoulder blades of the user's body are stretched during arm movements. Further, the at least one flexible panel 112 integrated at the rear portion 106 reduces bulk around the shoulder blades.

In some embodiments, the outer layer 104 further comprises a collar 114 having a front shield 126 and a chinstrap 128 adapted to cover a neck and a chin of the user. In some embodiments, the front shield 126 refers to a protective panel on the front portion 110 of the outer layer 104. The front shield 126 may provide additional protection to the user's chest, torso, and neck that are vulnerable during firefighting or other hazardous activities, such as by covering a zipper. In some embodiments, the chinstrap 128 integrated in the collar 114 refers to a protective collar that may be fastened securely around the neck with the chinstrap 128.

In some embodiments, the collar 114 may be configured to protect the neck and/or lower face (chin) of the user from heat, flames, debris, and other toxic particulates in hazardous conditions. In an example, when fastened with the chinstrap 128, the collar 114 may ensure that the protective garment 100 remains tightly sealed around the neck, minimizing the risk of exposure to hazardous conditions such as a fire outbreak. In some embodiments, the combination of the front shield 126 and the chinstrap 128 may provide enhanced protection to critically contoured areas of the user's body, e.g., the chest, neck, and/or face. Further, the outer layer 104 may further comprise a name plate 116 which may comprise a preprinted name tag or an attachment point to which a user may attach a name tag to the protective garment 100.

In some embodiments, at least one flexible panel 112 may only be fabricated on sleeve portions 108 covering the elbow to provide free bending of the user's arms at the elbow. In some embodiments, the at least one flexible panel 112, may cover the armhole that provide free stretching of the user's arms upwards while performing various tasks (e.g., using fire extinguishing tools during a fire outbreak).

In some embodiments, the outer layer 104 is further integrated with a plurality of reflective strips 118 to enhance visibility of the protective garment. In some embodiments, the front portion 110, the sleeve portion 108, and the rear portion 106 of the outer layer 104 are integrated with the plurality of reflective strips 118. In an example, the plurality of reflective strips 118 may be fabric bands made from a material that reflects light, typically retroreflective material. The retroreflective material aids the plurality of reflective strips 118 to bounce light back towards its source, making the plurality of reflective strips 118 highly visible in low-light conditions. In an example, an instance when the user wearing the protective garment 100 may be working in low light hazardous conditions such as laboratory with toxic chemical leakage, the plurality of reflective strips 118 may glow to locate the user. In some embodiments, the sleeve portion 108 may comprise a set of wristbands 120 to snuggly secure sleeves of the protective garment 100 around the user's wrist.

In some embodiments, the outer layer 104 may comprise a plurality of pockets 124 along with one or more loop elements 130. In some embodiments, the plurality of pockets 124 along with the one or more loop elements 130 may be used to secure and carry one or more tools or instruments during the hazardous conditions. In an example, the plurality of pockets 124 along with the one or more loop elements 130 may be used to secure and carry one or more fire extinguishing tools or instruments during the fire outbreak.

FIG. 2 illustrates a rear view of the protective garment 100, in accordance with an example embodiment of the present disclosure.

In some embodiments, the rear portion 106 of the outer layer 104 may comprise an overlay panel 200. In some embodiments, the overlay panel 200 may be sewn to the rear portion 106 of the outer layer 104 at the first side 202 and the second side 204 of the overlay panel 200. In some embodiments, the overlay panel 200 further comprises the third side 206 and the fourth side 208. In an example, the first side 202 corresponds to the top side, the second side 204 corresponds to the bottom side, the third side 206 corresponds to the left side, and the fourth side 208 corresponds to the right side of the overlay panel 200. In some embodiments, the first side 202 of the overlay panel 200 is sewn to the shoulder region of the outer layer 104 and the second side 204 is sewn to the middle back region of the outer layer 104. Further, the third side 206 and the fourth side 208 of the overlay panel 200 are separated from the outer layer 104 via the gusset 212. In some embodiments, the third side 206 and the fourth side 208 of the overlay panel 200 are separated from the outer layer 104 via the gusset 212 to allow ventilation of air through the gusset 212. In some embodiments, the overlay panel 200 is sewn to cover at least a portion of the at least one flexible panel 112.

In some embodiments, the overlay panel 200 may enhance protection to the user's back from the exposure to heat, fire, or exothermic chemicals along with required flexibility and breathability through the at least one flexible panel 112. In some embodiments, the overlay panel 200 may be configured to cover the at least one flexible panel 112 to prevent risk of heat, fire, or exothermic chemicals penetrating through the at least one flexible panel 112 and affecting the user's back.

In some embodiments, the overlay panel 200 may cover most of the area of the rear portion 106 of the outer layer 104. In some embodiments, the overlay panel 200 may be made of stretchable fabric that is breathable and enable blocking particulates during hazardous conditions (e.g., a fire outbreak). In an example, during chemical leakage in a laboratory, the overlay panel 200 sewn with the at least one flexible panel 112 may block the toxic gases or heat produced by the exothermic chemicals to protect the user's back.

In some embodiments, the at least one flexible panel 112 may be made of lightweight, breathable, stretchable fabric that enhances back, shoulder and neck movements of the user while performing the one or more tasks. In some embodiments, each of the sleeve portion 108 may include an articulating elbow panel to improve mobility and flexibility at the elbow joint, allowing for more natural arm movement without restricting the user. In an example, the articulating elbow panel may be made of the at least one flexible panel 112 to accommodate bending and stretching of the user's arm. In some embodiments, the articulating elbow panel include the at least one flexible panel 112 with the vent panel 122 along complete length of each of the sleeve portion 108. The at least one flexible panel 112 with the vent panel 122 may be integrated under the outer layer 104 such that the vent panel 122 may be located above trim line of each of the sleeve portion 108. Further, each of the sleeve portion 108 may include at least two elbow pleats 210 at the rear portion 106 of the protective garment 100 to improve flexibility and enhance range of motion of the user's arms.

FIG. 3 illustrates a side view of the protective garment 100, in accordance with an example embodiment of the present disclosure. FIG. 4 illustrates another side view of the protective garment 100, in accordance with an example embodiment of the present disclosure.

In an example, a left side view and a right side view of the protective garment 100 is shown in FIG. 3 and FIG. 4, respectively. In some embodiments, the protective garment 100 may comprise the inner layer 102 and the outer layer 104. Further, the outer layer 104 may comprise the front portion 110, the rear portion 106 and the sleeve portion 108. In some embodiments, the user may wear the protective garment 100 to cover the body. In some embodiments, the user may be a front-line worker or emergency responder during hazardous conditions. In an example, the hazardous conditions may correspond to fire outbreak, toxic gas, or chemical leakage.

In an example, the user may be a firefighter. The firefighter may wear the protective garment 100 before entering a site of a fire outbreak. The front portion 110, the rear portion 106, and the sleeve portion 108 of the outer layer 104 protects chest, torso, neck, arms, and back of the fire fighter from being exposed to damaging heat of fire. In some embodiments, the outer layer 104 may be detachably attached to the inner layer 102 of the protective garment 100. The outer layer 104 may be made of heat resistant and insulated fabric. In some embodiments the outer layer 104 may be configured to protect the fire fighter from exposure to the heat when the fire fighter enters the site of fire outbreak. The outer layer 104 serves as insulated, fire-proof protective barrier to prevent skin burns when the fire fighter performs one or more tasks at the site of a fire outbreak.

In some embodiments, the at least one flexible panel 112 may be integrated in the rear portion 106 and the sleeve portion 108 of the outer layer 104. In some embodiments, the at least one flexible panel 112 may be configured to provide flexibility, so that the firefighter is able to move or bend arms freely, without resistance. In some embodiments, each of the at least one flexible panel 112 is made of lightweight, breathable, stretchable fabric. In some embodiments, the at least one flexible panel 112 integrated in the sleeve portion 108 covering the armhole and the elbow may enhance elbow movement and dexterity of the firefighter's hands. In some embodiments, the at least one flexible panel 112 integrated in the rear portion 106 provides flexibility in the firefighter's back and reduces bulk in shoulder blades when the firefighter moves, bends or stretches hands. In some embodiments, the gusset 212 may be seen between the third side 206 and the fourth side 208 of the overlay panel 200.

In some embodiments, at least one flexible panel 112 may be integrated within the collar 114 having the front shield 126 and the chinstrap 128. The front shield 126 may provide additional protection to the firefighter's chest and torso that are vulnerable to burns at the site of a fire outbreak. In some embodiments, the collar 114 may be configured to protect the neck and lower face (chin) of the firefighter from heat, flames, debris, and other toxic particulates at the site of a fire outbreak. In an example, when fastened with the chinstrap 128, the collar 114 may ensure that the protective garment 100 remains tightly sealed around the neck, minimizing the risk of exposure to heat. In some embodiments, the combination of the front shield 126 and the collar 114 may provide enhanced protection to critical areas of the firefighter's body e.g. the chest, neck, and face.

In some embodiments (shown in FIG. 3 & FIG. 4), the at least one flexible panel 112 may be integrated at the sleeve portion 108 specifically covering the armhole. In an example, the at least one flexible panel 112 at the sleeve portion 108 covering the armhole may provide free stretching of the firefighter's arms upwards or downwards, based on the one or more movements needed at the site of a fire outbreak.

In some embodiments, the outer layer 104 is further integrated with the plurality of reflective strips 118 to enhance visibility of the protective garment. The outer layer 104 may include the plurality of reflective strips 118 at the sleeve portion 108, the front portion 110, and/or the rear portion 106. In an example, an instance when the fire fighter enters the site of a fire outbreak having extremely low light, the plurality of reflective strips 118 may glow in the dark to locate the fire fighter at the site. In some embodiments, the sleeve portion 108 of the outer layer 104 may comprise a set of wristbands 120 to snuggly secure the sleeves of the protective garment 100 around the fire fighter's wrist.

In some embodiments, the outer layer 104 may comprise the plurality of pockets 124 along with the one or more loop elements 130 to securely carry one or more fire extinguishing or escape tools (such as harness) at the site. In some embodiments, the plurality of pockets 124 may be fabricated with the at least one flexible panel 112 to improve dexterity of the fire fighter's body.

FIG. 5 illustrates a flowchart showing a method 500, in accordance with an example embodiment of the present disclosure.

At operation 502, the at least one flexible panel 112 may be integrated at the first portion 106 and the second portion 108 of the outer layer 104 detachably attached over the inner layer 102 of the protective garment 100. In some embodiments, the first portion 106 and the second portion 108 may correspond to the rear portion 106 and the sleeve portion 108 of the outer layer 104, respectively. In some embodiments, the at least one flexible panel 112 is configured to provide flexibility to the outer layer 104 of the protective garment 100. Further, the outer layer 104 is configured to provide protection during exposure to hazardous conditions. In an example, the hazardous conditions may correspond to a fire outbreak, toxic gas or chemical leakage. In some embodiments, the protective garment 100 may be worn by a fire fighter such that the front portion 110 covers the chest and neck, the rear portion 106 covers the back, and the sleeve portion 108 cover the arms and underarms of the fire fighter.

In some embodiments, the outer layer 104 may be configured to provide protection during exposure to fire. In an example, the outer layer 104 may be configured to protect the fire fighter's body from exposure to heat, fire or exothermic chemicals during the fire emergency. In some embodiments, the front portion 110 of the outer layer 104 comprises the collar 114 with the front shield 126 and the chinstrap 128 to protect neck and chin of the firefighter from exposure to fire.

At operation 504, the overlay panel 200 may be sewn to the first portion 106 of the outer layer 104 at the first side 202 and the second side 204 of the overlay panel 200 to cover at least a portion of the at least one flexible panel 112 integrated at the first portion 106. Further, the at least one flexible panel 112 is configured to provide flexibility in the rear portion 106 and the sleeve portion 108 of the outer layer 104. In an example, the at least one flexible panel 112 is configured to provide flexibility in back and arms (including elbow, underarms) of the user.

In some embodiments, the at least one flexible panel 112 is made of lightweight, breathable, stretchable, fabric and the outer layer 104 is made of heat resistant and insulated fabric. In some embodiments, the at least one flexible panel 112 may be integrated in the sleeve portion 108 covering the armhole and the elbow that may enhance elbow movement and dexterity of the user's hands. In some embodiments, the rear portion 106 of the outer layer 104 may comprise the overlay panel 200 integrated with the at least one flexible panel 112. In some embodiments, the overlay panel 200 may enhance protection at back of the fire fighter's body from the exposure to heat and fire along with required flexibility and breathability through the at least one flexible panel 112. In some embodiments, the outer layer 104 may comprise the plurality of reflective strips 118 to enhance visibility of the protective garment 100 and locate the fire fighter at the emergency site.

Embodiments may be configured to provide the protective garment 100 for providing protection to a front line emergency worker against exposure to hazardous emergency conditions such as gas leakage, chemical leakage, fire outbreak, etc. Embodiments may be configured to provide flexibility at mobility critical areas and overall breathability to the front line emergency worker wearing the protective garment 100. Embodiments may be configured to enable the front line emergency worker to carry one or more tools or instruments at the emergency site. Embodiments may be configured to locate the front line emergency worker at the light deprived emergency site.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A protective garment comprising:

an inner layer; and an outer layer detachably attached over the inner layer, the outer layer comprising:

at least one flexible panel integrated at a first portion and a second portion of the outer layer of the protective garment, wherein the at least one flexible panel is configured to provide flexibility to the protective garment; and an overlay panel sewn to the first portion of the outer layer at a first side corresponding to a top side of the overlay panel and a second side corresponding to a bottom side of the overlay panel to cover at least a portion of the at least one flexible panel integrated at the first portion, the overlay panel including a third side corresponding to a left side of the overlay panel and a fourth side corresponding to a right side of the overlay panel, wherein the first side of the overlay panel is sewn to a shoulder region of the outer layer and the second side is sewn to a middle back region of the outer layer; and wherein the third side and the fourth side of the overlay panel are separated from the outer layer via a gusset.

2. The protective garment of claim 1, wherein the first portion corresponds to a rear portion of the outer layer and the second portion corresponds to a sleeve portion of the outer layer.

3. The protective garment of claim 1, wherein the third side and the fourth side of the overlay panel are separated from the outer layer via the gusset to allow ventilation of air through the gusset.

4. The protective garment of claim 1, wherein the second portion further comprises a vent panel fabricated over the at least one flexible panel integrated at the second portion of the outer layer, wherein the vent panel is configured to provide ventilation to a user from the second portion of the outer layer.

5. The protective garment of claim 1, wherein the outer layer further comprises a collar having a front shield and a chinstrap adapted to cover a neck and a chin of a user.

6. The protective garment of claim 1, wherein the outer layer is further integrated with a plurality of reflective strips to enhance visibility of the protective garment.

7. The protective garment of claim 1, wherein the at least one flexible panel integrated at the first portion and the second portion of the outer layer is breathable and configured to block particulate matters from entering into the inner layer.

8. The protective garment of claim 1, wherein the at least one flexible panel is made of lightweight, air-permeable, and stretchable fabric and the outer layer is made of light weight, air-permeable, stretchable, and heat resistant fabric.

9. A method comprising:

integrating at least one flexible panel at a first portion and a second portion of an outer layer detachably attached over an inner layer of a protective garment, wherein the at least one flexible panel is configured to provide flexibility to the protective garment; and sewing an overlay panel to the first portion of the outer layer at a first side corresponding to a top side of the overlay panel and a second side corresponding to a bottom side of the overlay panel to cover at least a portion of the at least one flexible panel integrated at the first portion, the overlay panel including a third side corresponding to a left side of the overlay panel and a fourth side corresponding to a right side of the overlay panel; and sewing the first side of the overlay panel to a shoulder region of the outer layer and the second side to a middle back region of the outer layer; and wherein the third side and the fourth side of the overlay panel are separated from the outer layer via a gusset.

10. The method of claim 9, wherein the first portion corresponds to a rear portion of the outer layer and the second portion corresponds to a sleeve portion of the outer layer.

11. The method of claim 9, wherein the third side and the fourth side of the overlay panel are separated from the outer layer via the gusset to allow ventilation of air through the gusset.

12. The method of claim 9, further comprising fabricating a vent panel over the at least one flexible panel integrated at the second portion of the outer layer, wherein the vent panel is configured to provide ventilation to a user from the second portion of the outer layer.

13. The method of claim 9, wherein the outer layer further comprises a collar having a front shield and a chinstrap adapted to cover a neck and a chin of a user.

14. The method of claim 9, further comprising integrating a plurality of reflective strips at the outer layer to enhance visibility of the protective garment.

15. The method of claim 9, wherein the at least one flexible panel integrated at the first portion and the second portion of the outer layer is breathable and configured to block particulate matters from entering into the inner layer.

16. The method of claim 9, wherein the at least one flexible panel is made of lightweight, air-permeable, and stretchable fabric and the outer layer is made of light weight, air-permeable, stretchable, and heat resistant fabric.

17. The method of claim 9, wherein the outer layer includes a heat resistant and insulated fabric and the flexible panel includes a tri-laminate textile having at least two meta-aramid knits.

18. The protective garment of claim 1, wherein the outer layer includes a heat resistant and insulated fabric and the flexible panel includes a tri-laminate textile having at least two meta-aramid knits.

* * * * *